United States Patent
Choi et al.

(10) Patent No.: US 7,274,707 B2
(45) Date of Patent: Sep. 25, 2007

(54) COEXISTENCE OF STATIONS CAPABLE OF DIFFERENT MODULATION SCHEMES IN A WIRELESS LOCAL AREA NETWORK

(75) Inventors: Sunghyun Choi, Seoul (KR); Olaf Hirsch, Sunnyvale, CA (US); Atul Garg, San Jose, CA (US); Javier del Prado Pavon, Ossining, NY (US)

(73) Assignee: Koninklijke Philips Electronics N. V., Eindhoven (NL)

( * ) Notice: Subject to any disclaimer, the term of this patent is extended or adjusted under 35 U.S.C. 154(b) by 1086 days.

(21) Appl. No.: 10/278,288

(22) Filed: Oct. 23, 2002

(65) Prior Publication Data

US 2003/0169763 A1 Sep. 11, 2003

Related U.S. Application Data

(60) Provisional application No. 60/362,520, filed on Mar. 7, 2002.

(51) Int. Cl.
*H04L 12/413* (2006.01)

(52) U.S. Cl. .................................... 370/445; 370/389
(58) Field of Classification Search ............. 370/310.2, 370/322, 328, 349, 338, 204, 264, 265, 445, 370/389, 208
See application file for complete search history.

(56) References Cited

U.S. PATENT DOCUMENTS

| 6,990,116 B1 * | 1/2006 | Young et al. ................ 370/445 |
| 2003/0128684 A1 * | 7/2003 | Hirsch et al. ................ 370/338 |

\* cited by examiner

*Primary Examiner*—Brenda Pham

(57) ABSTRACT

A local-area network is provided where a plurality of OFDM stations and DSSS/CCK-only stations coexist. A beacon signal having a contention-free-period (CFP) is transmitted from an access point to the plurality of stations. The OFDM-modulated data is transmitted to the plurality of stations before the CFP ends, and after the CFP period ends, the DSSS/CCK-modulated data is transmitted, thereby preventing collisions between the stations.

22 Claims, 6 Drawing Sheets

FIG. 1

COEXISTENCE OF STATIONS CAPABLE OF DIFFERENT MODULATION SCHEMES IN A WIRELESS LOCAL AREA NETWORK

CROSS REFERENCE TO RELATED APPLICATION

This application claims the benefit of U.S. Provisional Application No. 60/362,520, filed on Mar. 7, 2002.

BACKGROUND OF THE INVENTION

1. Field of the Invention

The present invention relates to wireless-local-area networks, and particularly, to the coexistence of stations with different modulation schemes.

2. Description of the Related Art

The medium-access control (MAC) and physical characteristics for wireless-local-area networks (WLANs) to support physical-layer units are specified in the IEEE 802.11 standard, which is defined in International Standard ISO/IEC 8802-11, "Information Technology—Telecommunications and Information Exchange Area Networks," 1999 Edition, which is hereby incorporated by reference in its entirety.

The IEEE 802.11 WLAN standard provides a number of physical-layer options in terms of data rates, modulation types, and spread of spectrum technologies. In particular, the IEEE 802.11b standard defines a set of specifications of physical layers operating in the 2.4 GHz ISM frequency band up to limps. The direct-sequence-spread spectrum/complementary-code keying (DSSS/CCK) physical layer is one of the three physical layers supported in the IEEE 802.11 standard and uses the 2.4 GHz frequency band as the RF-transmission media. The 802.11g standard, which is compatible with the IEEE 802.11 MAC, will implement all mandatory portions of the IEEE 802.11b PHY standard, and the stations will communicate in orthogonal-frequency-division-multiplexing (OFDM) modulation. There are two types of access mechanisms to the wireless medium by the stations: (1) the point-coordination function and (2) the distributed-coordination function. The point-coordination function is a centrally-controlled access mechanism in which the access-point AP controls the access of the stations to the wireless medium. During operation, the access-point AP regularly polls the stations for traffic information and data to be transmitted while also transmitting data to the stations. As one skilled in the art would appreciate, the access-point AP begins a period of operation, called the contention-free-period CFP, during which the point-coordination function is operative. During this contention-free-period CFP, access to the medium is completely controlled by the access-point AP. The contention-free-period CFP occurs periodically to provide a near-isochronous service to the stations. The IEEE 802.11 specification also defines a contention-period CP alternating with the contention-free-period CFP during which the distributed coordination-function rules operate and all stations may compete for access to the medium.

When both the 802.11b and 802.11g-compliant stations operate in the same WLAN environment, there are drawbacks in that the 802.11b stations cannot recognize the 802.11g-OFDM transmission as a busy medium so that there can be undesirable collisions between the 802.11g and 802.11b stations. To this end, the 802.11g standard proposes a mechanism where the RTS/CTS frame exchanges are used to enable the co-existence of stations with different modulation schemes. However, the RTS/CTS overhead tends to degrade the performance of the 802.11g stations.

Accordingly, there is a need to provide the co-existence of 802.11g and 802.11b stations without degrading the 802.11g performance, such as the overhead for RTS/CTS frame exchanges.

SUMMARY OF THE INVENTION

The present invention provides a mechanism to exist between the OFDM stations and legacy-DSSS/CCK stations in the same environment.

According to one aspect of the invention, a wireless-local-area network is provided and includes: at least one access point capable of transmitting and receiving data modulated using a first modulation scheme and a second modulation scheme; at least one first station capable of transmitting and receiving data modulated using the first modulation scheme; and, at least one second station capable of transmitting and receiving data modulated using the second modulation scheme, wherein the access point transmits data modulated using the first modulation scheme if the transmission of data modulated according to the first modulation scheme is possible before the CFP expires, and transmits data modulated according to the second modulation scheme after the contention-free-period ends. If the transmission of data modulated according to the first modulation scheme is not possible before the CFP expire, the first station transmits request-to-send and clear-to-send frames modulated according to the second modulation scheme. The first modulation scheme is an OFDM modulation scheme, and the second modulation scheme is a DSSS/CCK modulation scheme.

According to another aspect of the invention, a method for providing a communication between an access point and a plurality of stations having at least one first station and at least one second station in a wireless-local-area network (WLAN) is provided. The method includes the steps of: transmitting a beacon signal having a contention-free period (CFP) followed by a contention period (CP) to the plurality of the stations; determining whether a transmission of OFDM-modulated data is possible before the CFP expires; if so, transmitting the OFDM-modulated data to the plurality of the stations; and, transmitting DSSS/CCK-modulated data during the contention period (CP). The method further includes the steps of: transmitting a request-to-send (RTS) frame comprising information representative of OFDM-modulation capability if the transmission of the OFDM-modulated data is not possible before the CFP expires; and, transmitting the OFDM-modulated data if a clear-to-send frame (CTS) from the at least first station indicating an acceptance of the OFDM modulation is received.

According to a further aspect of the invention, a system is provided and includes: a first station capable of transmitting and receiving data modulated using a first modulation scheme; a second station capable of transmitting and receiving data modulated using a second modulation scheme; and, an access point for communicating with the first and the second stations, wherein the access point transmits a beacon frame indicating a beginning of a contention-free period followed by a contention period, and the contention-free period comprises a sub-contention period before the contention-free period expires during which the second station is enabled to transmit data modulated according to the second modulation scheme, and wherein the sub-contention period occurs before the contention-free period expires.

BRIEF DESCRIPTION OF THE DRAWINGS

FIG. 1 shows a wireless-local-area network of the invention;

DETAILED DESCRIPTION OF THE EMBODIMENTS

In the following description, for purposes of explanation rather than limitation, specific details are set forth, such as the particular architecture, interfaces, techniques, etc., in order to provide a thorough understanding of the present invention. However, it will be apparent to those skilled in the art that the present invention may be practiced in other embodiments that depart from these specific details.

Figure 1:
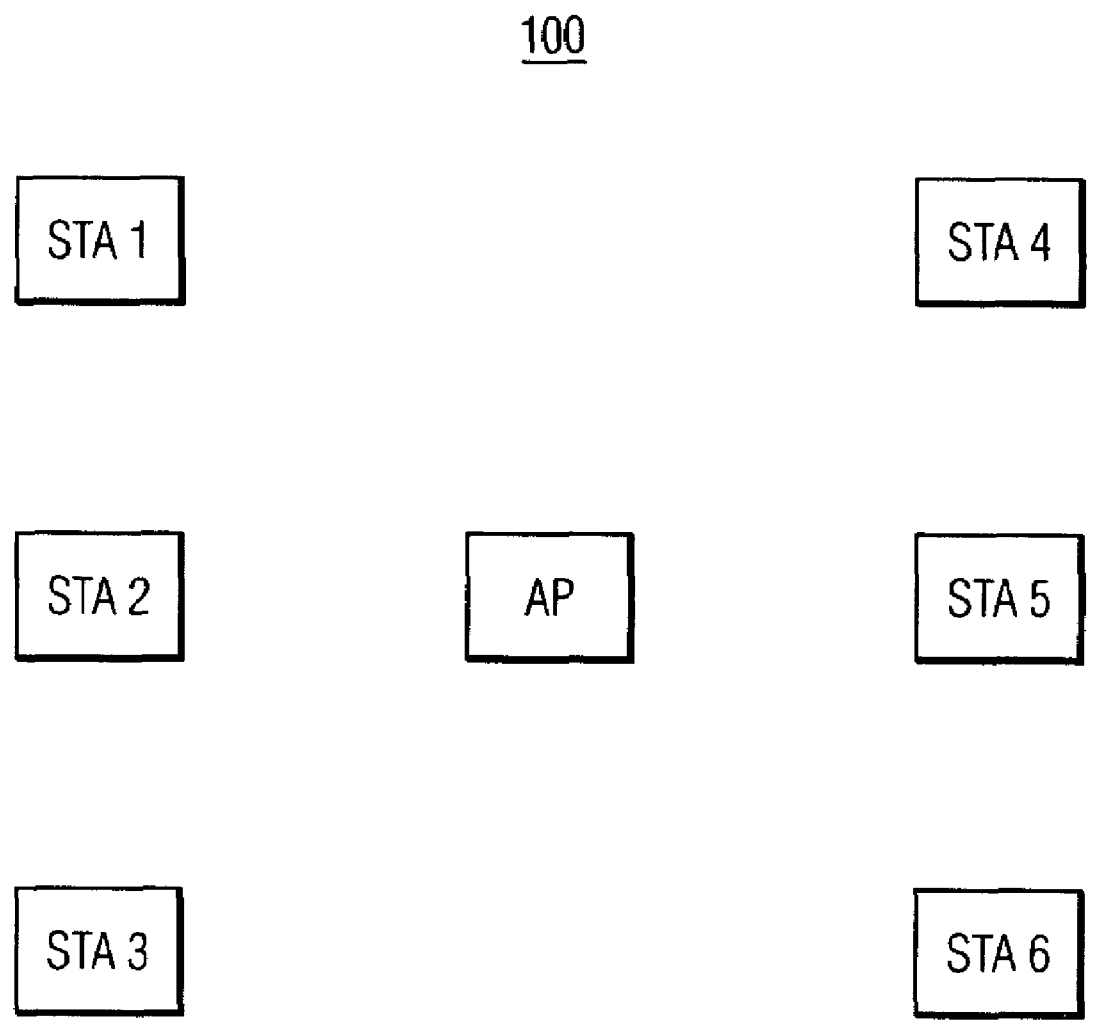

Referring to FIG. 1, an 802.11 wireless-local-area network 100 comprises an access-point AP and a plurality of stations STA1-STA6, which, through a wireless link, are communicating with each other and to the AP via a plurality of wireless channels. A station STA may communicate with another station directly or with another station STA via the access-point AP; or the station STA may communicate with only the access-point AP. A key principle of the present invention is to provide a mechanism to enable the co-existence of both 802.11b and 802.11g stations in the same WLAN shown in FIG. 1.

According to an embodiment of the present invention, the system 100 comprises a first group of stations STA1-STA3 capable of transmitting and receiving DSSS/CCK-modulated data (or 802.11b-compliant data) and a second group of stations STA4-STA6 capable of transmitting and receiving OFDM-modulated data (or 802.11g compliant data). As such, when the access-point AP desires to communicate with one of the stations STA1-STA3, the access-point AP transmits DSSS/CCK-modulated frames. However, when the access-point AP communicates with one of the stations STA4-STA6, the access-point AP uses the OFDM modulation if the access-point AP is aware, at the time of transmission, that the intended receiving stations STA4-STA6 are OFDM-capable.

Now, a detailed description of the mechanism that allows the co-existence of different 802.11-standard-compliance stations according to the embodiment of the present invention is explained herein.

Figure 2:
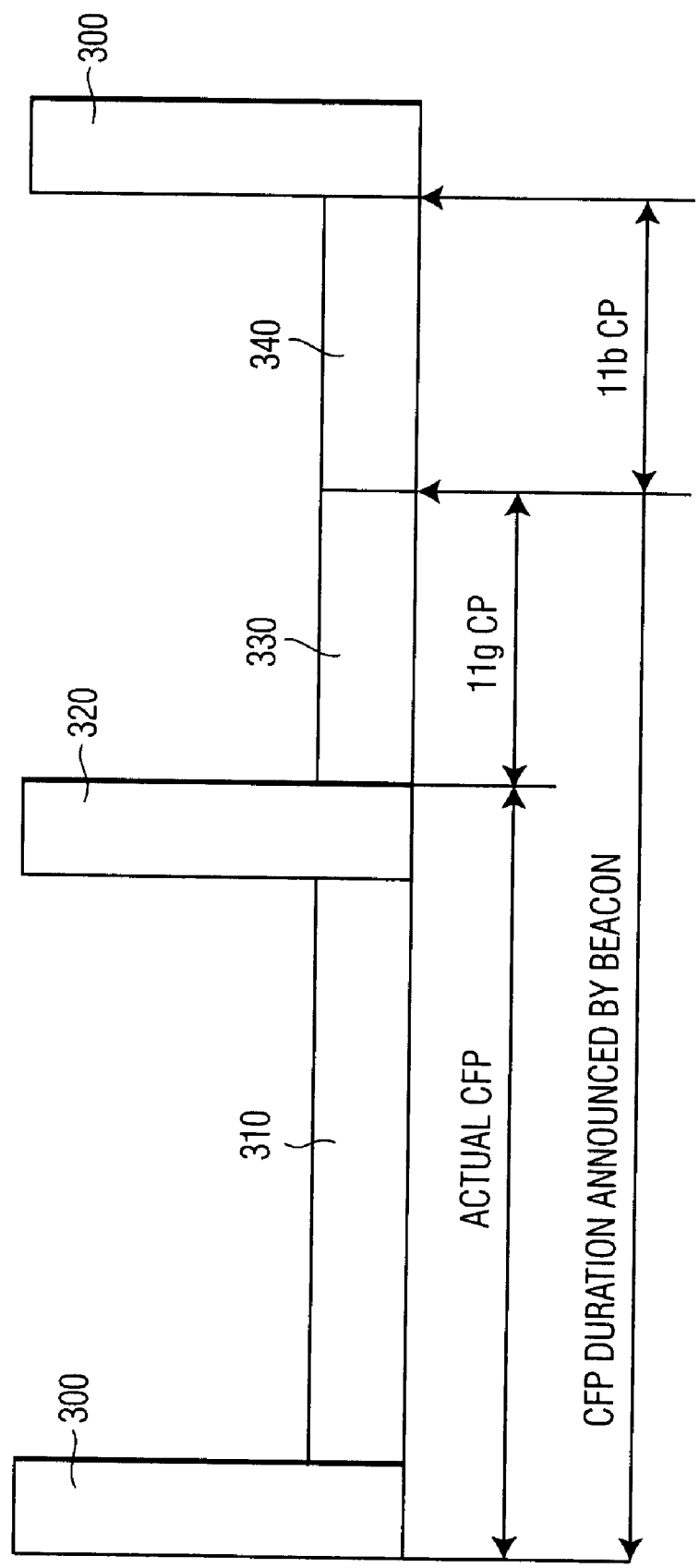
FIG. 2 is a timing diagram showing communication periods in a wireless-local-area network of the invention.

Referring to FIG. 2, a modified timing diagram 200 illustrating a contention-free-period (CFP) followed by a contention-period (CP) according to the embodiment of the present invention is explained. As one skilled in this art would appreciate, the contention-free-period CFP begins when the access-point AP gains access to the medium during a previous contention-period CP using the distributed coordination-function procedures. Upon gaining access to the wireless medium, the access-point AP transmits a beacon-frame BF 300 to the stations STA1-STA6, thus initiating a contention-free-period CFP. The contention-free-period CFP is followed by a contention-period CP. Note that the transmission of the beacon-frame BF 300 may be periodical; however, the transmission of the beacon-frame BF 300 may be slightly delayed from an ideal start as the access-point AP must compete for the medium according to the distributed-coordination-function rules.

Figure 3A:
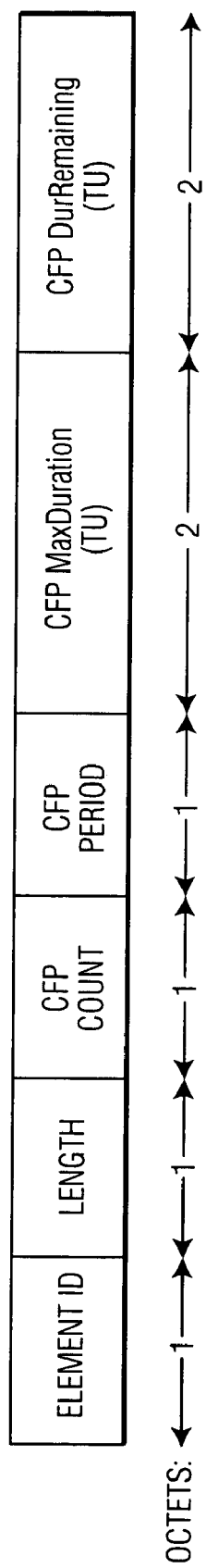
FIGS. 3(a) and 3(b) illustrate frames used in a wireless-local-area network.

As shown in FIG. 2, the contention-free-period CFP consists of a first sub-part, a CCK/OFDM contention-free period 310; a second sub-part, an OFDM contention period 330; and, a third sub-part, a CCK contention period 340. During the contention-free period CFP 310, the access-point AP has control of the medium and delivers traffic to stations STA1-STA6 and may poll stations STA1-STA6 that have requested content-free service for them to deliver traffic to the access-point AP or to another station STA in the network. If the station STA polled has traffic to send, it may transmit one frame for each contention-free-poll CF-Poll received. If the station STA has no traffic to send, it may decide not to respond to the contention-free poll CF-Poll. The access-point AP may send the contention-free-poll CF-Poll addressed to a station together with data to be transmitted to that station. Accordingly, the traffic in the contention-free-period CFP comprises frames sent from the access-point AP to one or more of the stations STA1-STA6 followed by the acknowledgment from those stations. For example, FIG. 3(a) illustrates the starting time and duration of the transmission opportunity indicated in the frame header of the contention-free-poll frame CF-Poll transmitted by the access-point AP during the contention-free period.

Note that the primary mechanism for preventing stations from gaining access to the medium during the contention-free-period CFP is the network-allocation vector (NAV) implemented by the IEEE 802.11 MAC. The NAV is a value that indicates to a station STA the amount of time that remains before the medium will become available. The NAV may be kept current in a station through duration values that are transmitted in all frames. The beacon-frame BF sent by the access-point AP at the beginning of the contention-free-period CFP may contain information from the access-point AP about the maximum expected length of the contention-free-period CFP. A station STA receiving the beacon-frame BF will enter this information into its NAV and is thus prevented from independently gaining access to the medium until the contention-free-period CFP concludes or until the access-point AP specifies otherwise to the station STA.

Figure 3B:
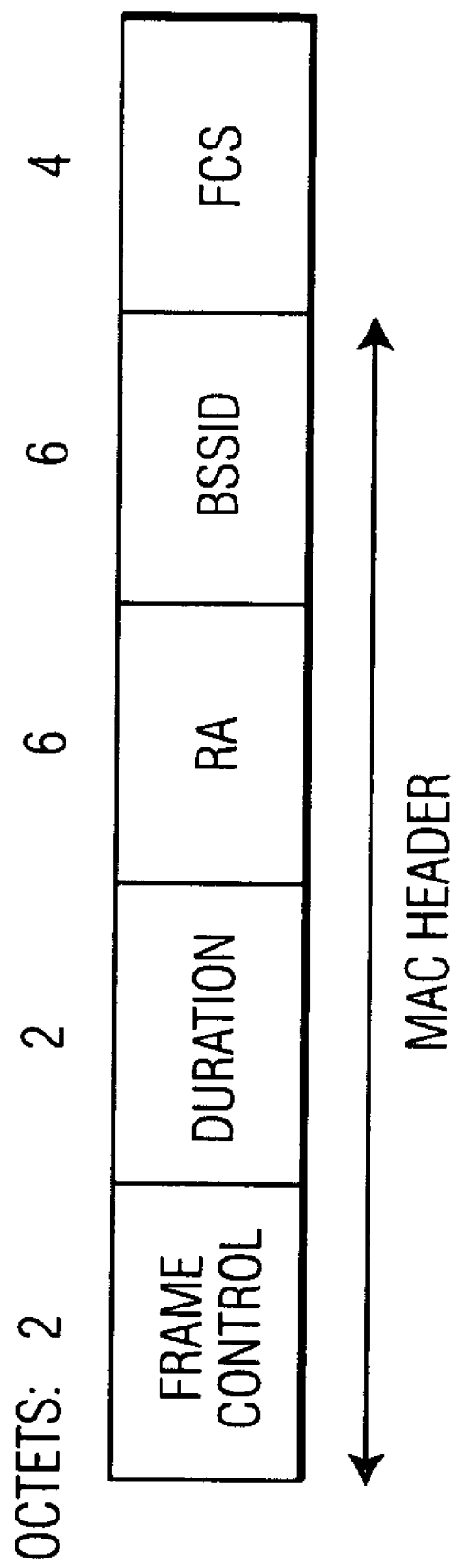

With continued reference to FIG. 2, the CFP ends at the time that was specified in the CF parameter-set information or earlier than that time if a CF-END or CF-END+CF-ACK frame is transmitted from the AP, as shown in FIG. 3(b). In the present invention, the AP transmits the CF-END or the CF-END+CF-ACK control frame to all stations using one of the OFDM-modulation schemes of 802.11g. Note that only the STA4-STA6 stations in compliance with 802.11g will interpret the OFDM-CP information signal. As a result, this frame will not be received by the 802.11b stations so that the 802.11b stations (STA1-STA3) understand that the CFP will continue until the time when the CFP was scheduled to end according to the CFP parameter-set information frame as shown in FIG. 3(b). Therefore, the 802.11b stations will not contend during the OFDM-CP period 330, and the 802.11g stations STA4-STA6 communicate with the access-point AP when polled by the access-point AP. According to the proposed 802.11g standard, stations STA4-STA6 will normally gain access to the medium during the CP period 330 by sending a request-to-send RTS frame to the intended receiver and waiting to receive a clear-to-send CTS frame from the intended receiver to start transmitting. However, in the present invention, 802.11g stations may communicate during the period 330. As a result, the RTS and CTS frames are not necessarily modulated using DSSS/CCK modulation and instead may be OFDM-modulated, thereby enabling the reduction of the data overhead and the improvement of the bandwidth efficiency.

Upon receiving either the CF-END or CF-END+CF-ACK frame, the 802.11g stations reset their NAV period for the duration of the period 330, during which the 802.11g stations are allowed to gain access to the medium. Thereafter, when the CFP duration announced by the beacon or the NAV expires, the 802.11b stations are allowed to exchange during the 802.11b CP-period 340 and communicate with each other or with the access-point AP based on a distributed-coordination function.

Figure 4:
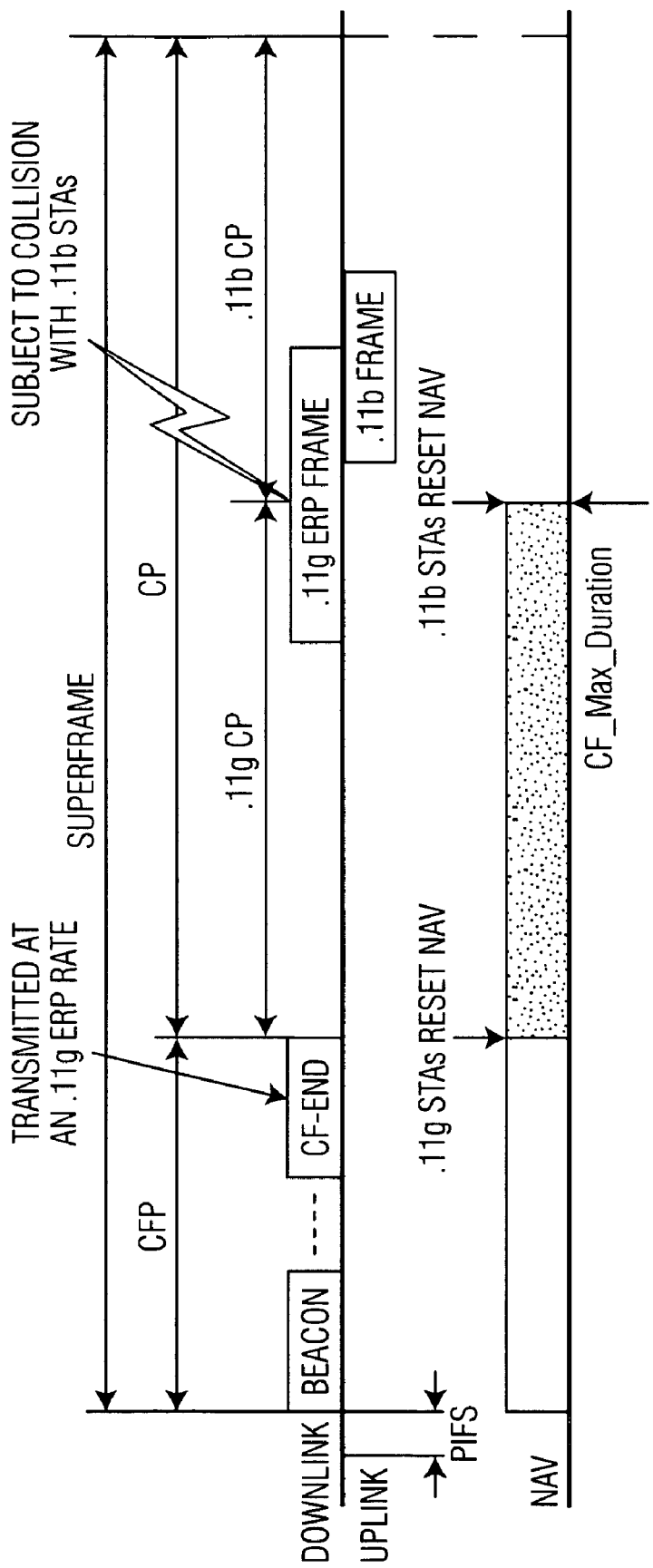
FIG. 4 is a detailed timing diagram showing communication periods in a wireless-local-area network of the invention.
Figure 5:
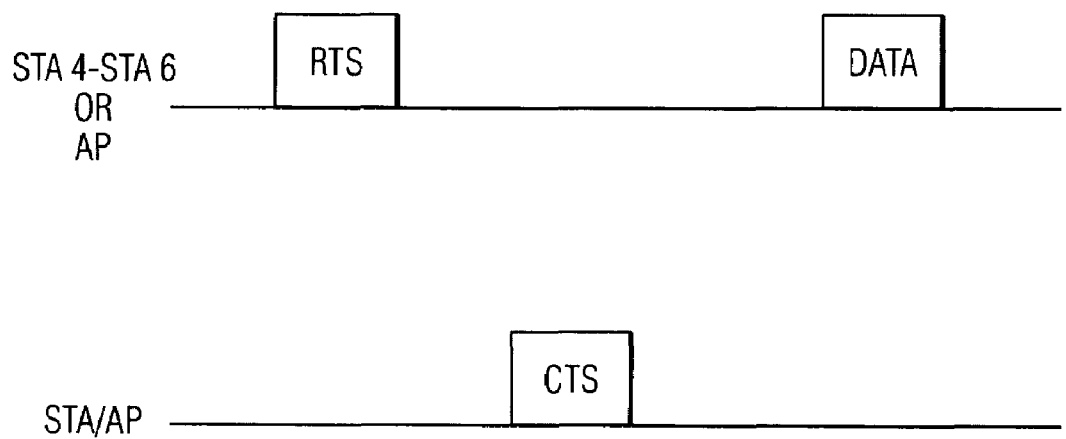
FIG. 5 shows request-to-send and clear-to-send frames of the invention.

It should be noted that the above-described mechanism works only if the 802.11g station can finish the frame exchanges before the time 0. This is because, as shown in FIG. 4, during the contention-period CP there may be a collision between the 802.11g and 802.11b stations using carrier-sense multiple access with collision avoidance. If such event occurs, the RTS/CTS mechanism as proposed in the 802.11g standard should be implemented. Thus, the stations STA4-STA6 may communicate using either the CCK modulation or the OFDM modulation if the 802.11g station is unable to finish the frame exchanges before the time 0. Thus, alternative RTSA and CTSA frames are introduced as shown in FIG. 5. If one of the OFDM stations STA4-STA6 or the access-point AP desires to transmit OFDM data during the contention period, it may transmit such alternative RTSA frame that comprises a field indicating that OFDM-modulated data is or will be transmitted. This alternative RTSA frame informs the receiving station that OFDM modulation could be used instead of DSSS/CCK. For example, one of the OFDM stations STA4-STA6 or the access-point AP sends a request-to-send frame RTSA including an element which requests the receiving station to use either an OFDM or a DSSS/CCK modulation for the data transfer. The RTSA frame is modulated in a DSSS/CCK. The receiving station, then, in its clear-to-send CTSA frame, indicates whether it accepts or refuses the OFDM modulation. If the receiving station refuses the OFDM modulation, the access-point AP or the stations STA4-STA6 use the DSSS/CCK modulation. If the station accepts the OFDM modulation, the access-point AP or the stations STA4-STA6 transmit OFDM-modulated data.

While the preferred embodiments of the present invention have been illustrated and described, it will be understood by those skilled in the art that various changes and modifications may be made, and equivalents may be substituted for elements thereof without departing from the true scope of the present invention. In addition, many modifications can be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

The invention claimed is:

1. A wireless-local-area network comprising:
   at least one access point of transmitting and receiving data modulated using a first modulation scheme and a second modulation scheme, said second modulation scheme being different from said first modulation scheme;
   at least one first station for transmitting and receiving data modulating using at least the first modulation scheme; and,
   at least one second station for transmitting and receiving data modulated using the second modulation scheme,
   wherein said access point transmits data modulated using the first modulation scheme if the transmission of data modulated according to the first modulation scheme is possible before the contention-free-period (CFP) expires, and transmits data modulated according to the second modulation scheme after the contention-free-period ends.

2. The local-area network as claimed in claim 1, wherein, if the transmission of data modulated according to the first modulation scheme is not possible before the CFP expire, the at least one first station transmits request-to-send and clear-to-send frames modulated according to the second modulation scheme.

3. The local-area network as claimed in claim 1, wherein said at least one first station operates under the IEEE 802.11g specification.

4. The local-area network as claimed in claim 1, wherein said at least one second station operates under the IEEE 802.11b specification.

5. The local-area network as claimed in claim 1, wherein the first modulation scheme is an OFDM modulation scheme.

6. The local-area network as claimed in claim 1, wherein the second modulation scheme is a DSSS/CCK modulation scheme.

7. A method for providing a communication between an access point and a plurality of stations having at least one first station and at least one second station in a wireless-local-area network (WLAN), the method comprising the steps of:
   transmitting a beacon signal having a contention-free period (CFP) followed by a contention period (CP) to said plurality of stations;
   determining whether a transmission of OFDM-modulated data is possible before the CFP expires;
   if so, transmitting the OFDM-modulated data to the plurality of said stations; and
   transmitting DSSS/CCK-modulated data during the contention period (CP).

8. The method as claimed in claim 7, wherein said method further comprises the steps of:
   transmitting a request-to-send (RTS) frame comprising information representative of OFDM-modulation capability if the transmission of said OFDM-modulated data is not possible before the CFP expires; and,
   transmitting the OFDM-modulated data if a clear-to-send frame (CTS) is received from said at least one first station indicating an acceptance of the OFDM modulation.

9. The method as claimed in claim 7, wherein said at least one first station operates under the IEEE 802.11g specification.

10. The method as claimed in claim 7, wherein said at least one second station operates under the IEEE 802.11b specification.

11. The method as claimed in claim 7, wherein said method further comprises the steps of:
   transmitting data from said access point to said plurality of stations during the CFP; and
   receiving an acknowledgment of data receipt therefrom.

12. A system comprising:
   a first station for transmitting and receiving data modulated using at least a first modulation scheme;

a second station for transmitting and receiving data modulated using a second modulation scheme, said second modulation scheme being different from said first modulation scheme; and an access point for communicating with the first and the second stations, wherein the access point transmits a beacon frame indicating a beginning of a contention-free period followed by a contention period, and the contention-free period comprises a sub-contention period before the contention-free period expires during which the second station is enabled to transmit data modulated according to the second modulation scheme.

13. The system as claimed in claim 12, wherein the first modulation scheme is a DSSS/CCK modulation scheme.

14. The system as claimed in claim 12, wherein the second modulation scheme is an OFDM modulation scheme.

15. The system as claimed in claim 12, wherein the sub-contention period occurs before the contention-free period expires.

16. The system as claimed in claim 12, wherein the system operates under the IEEE 802.11 specification.

17. A station in a local-area network, the station transmitting and receiving data using at least a first modulation scheme, the local-area network further comprising a second station for transmitting and receiving data using a second modulation scheme, and an access point for communicating with both said station and said second station, wherein the station receives a beacon frame transmitted by the access point indicating the beginning of a contention-free period followed by a contention period, and the contention-free period comprises a sub-contention period before the contention-free period expires during which the second station is enabled to transmit data modulated according to the second modulation scheme.

18. The station as claimed in claim 17, wherein the first modulation scheme is a DSSS/CCK modulation scheme.

19. The station as claimed in claim 17, wherein the second modulation scheme is an OFDM modulation scheme.

20. The station as claimed in claim 17, wherein the sub-contention period occurs before the contention-free period expires.

21. The station as claimed in claim 17, wherein the station operates under the IEEE 802.11 specification.

22. The station as claimed in claim 17, wherein the station is an access point.

\* \* \* \* \*